(12) United States Patent
Jensen et al.

(10) Patent No.: US 10,437,003 B2
(45) Date of Patent: Oct. 8, 2019

(54) OPTICAL FIBER DISTRIBUTION SYSTEM WITH CONNECTORIZED TETHER

(71) Applicant: CORNING OPTICAL COMMUNICATIONS LLC, Hickory, NC (US)

(72) Inventors: Joseph Clinton Jensen, Lawndale, NC (US); Tory Allen Klavuhn, Granite Falls, NC (US); Lars Kristian Nielsen, Hickory, NC (US); Benjamin Gray Whitener, Newton, NC (US)

(73) Assignee: Corning Optical Communications LLC, Charlotte, NC (US)

( * ) Notice: Subject to any disclaimer, the term of this patent is extended or adjusted under 35 U.S.C. 154(b) by 0 days.

(21) Appl. No.: 16/160,014

(22) Filed: Oct. 15, 2018

(65) Prior Publication Data

US 2019/0049685 A1    Feb. 14, 2019

Related U.S. Application Data

(63) Continuation of application No. PCT/US2017/025672, filed on Apr. 3, 2017.

(60) Provisional application No. 62/323,851, filed on Apr. 18, 2016.

(51) Int. Cl.
  *G02B 6/44* (2006.01)

(52) U.S. Cl.
  CPC ........ *G02B 6/4472* (2013.01); *G02B 6/4475* (2013.01)

(58) Field of Classification Search
  CPC .. G02B 6/4415; G02B 6/4416; G02B 6/4439; G02B 6/4466; G02B 6/4471; G02B 6/4472; G02B 6/4475

USPC .................................................. 385/100–114
See application file for complete search history.

(56) References Cited

U.S. PATENT DOCUMENTS

| 7,127,143 | B2 | 10/2006 | Elkins, II et al. |
| 7,277,614 | B2 | 10/2007 | Cody et al. |
| 7,590,321 | B2 | 9/2009 | Lu et al. |
| 7,729,584 | B2 * | 6/2010 | Cody .................. G02B 6/4495 385/114 |
| 8,224,140 | B2 | 7/2012 | Hurley |
| 8,582,941 | B2 | 11/2013 | Conrad et al. |
| 9,052,459 | B2 * | 6/2015 | Compton ............. G02B 6/2558 |
| 2010/0150504 | A1 | 6/2010 | Allen et al. |

(Continued)

FOREIGN PATENT DOCUMENTS

| EP | 2157461 A1 | 2/2010 |
| WO | 2010065632 A1 | 6/2010 |

OTHER PUBLICATIONS

International Search Report and Written Opinion of the International Searching Authority; PCT/US2017/025672; dated Jun. 16, 2017; 10 Pages; ISA/US Commissioner for Patents.

*Primary Examiner* — Michael P Mooney
(74) *Attorney, Agent, or Firm* — William D. Doyle

(57) ABSTRACT

An optical fiber distribution system is provided. The system includes a distribution cable having a plurality of cable optical fibers. The system includes a plurality of optical fiber tethers each including a tether optical fiber optically coupled to a cable optical fiber. The tethers provide access to and distribute the optical network at positions along the length of the optical fiber. The system is configured to provide access area organization and/or low profiles, such as through staggered tether lengths, tether webbing and/or access area sleeve arrangements.

16 Claims, 3 Drawing Sheets

(56) References Cited

U.S. PATENT DOCUMENTS

2013/0287349 A1* 10/2013 Faulkner ................ H01B 11/22
385/101
2013/0294735 A1 11/2013 Burris et al.

* cited by examiner

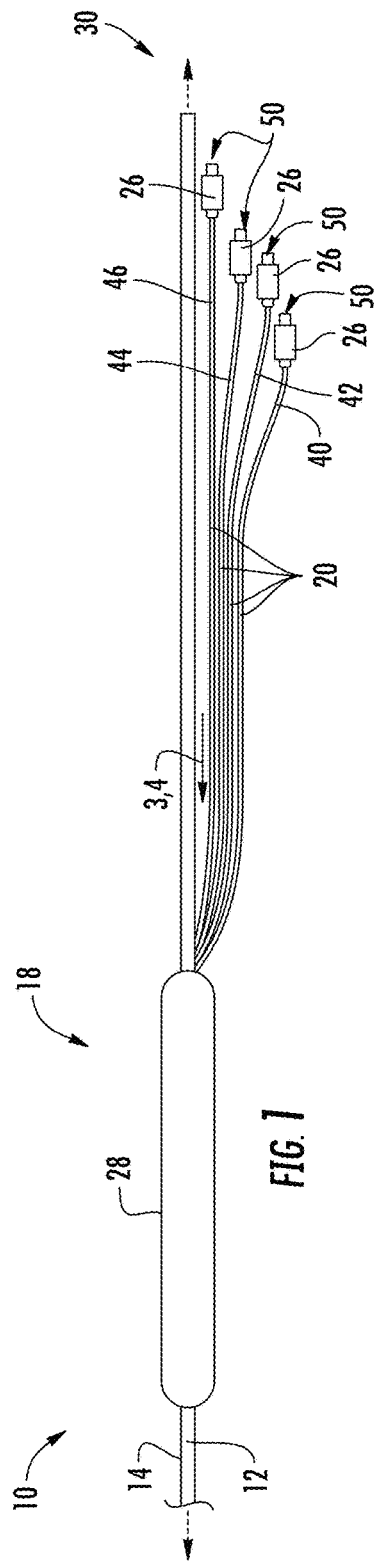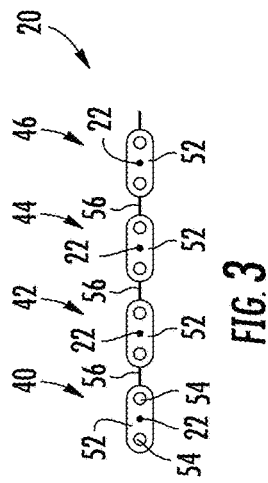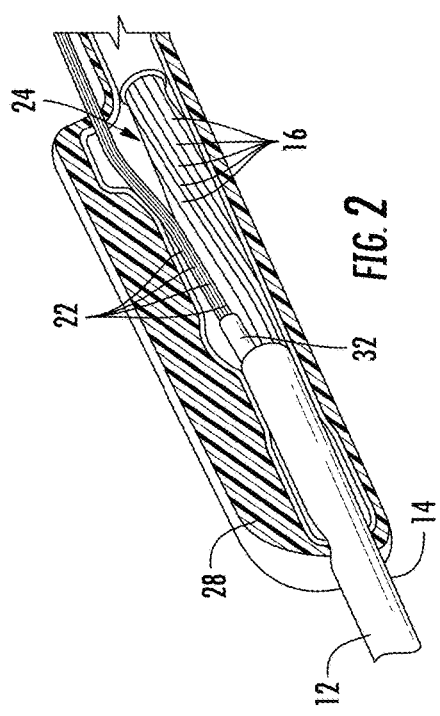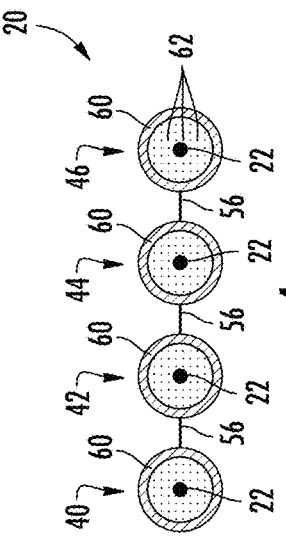

OPTICAL FIBER DISTRIBUTION SYSTEM WITH CONNECTORIZED TETHER

CROSS-REFERENCE TO RELATED APPLICATION

This application is a continuation of International Application No. PCT/US17/25672, filed on Apr. 3, 2017, which claims the benefit of priority to U.S. Application No. 62/323,851, filed on Apr. 18, 2016, both applications being incorporated herein by reference.

BACKGROUND

The disclosure relates generally to fiber distribution systems and more particularly to an optical fiber distribution system including one or more optical fiber tether optically coupled to a distribution cable in a manner that organizes and/or provides a low profile tether.

In conventional optical fiber distribution systems, a lower fiber count branch may be spliced to fiber(s) of the distribution cable at a point along the length of a distribution cable in order to provide network access to users at points along the length of the distribution cable. In this manner, optical network service from the cable is split out to users at various points along the length of the distribution cable.

SUMMARY

One embodiment of the disclosure relates to an optical fiber distribution system that comprises a plurality of distribution cable optical fibers extending between a first end and a second end of the distribution cable; and a distribution cable jacket surrounding the plurality of cable optical fibers. An access area may be located between the first end and the second end of the distribution cable, wherein the access area provides access through the distribution cable jacket to the distribution cable optical fibers. A first tether optical fiber has a first end optically coupled to a first distribution cable optical fiber at the access area, a second end, and a length between first and second ends of the first tether optical fiber. A first optical connector may be coupled to the second end of the first tether optical fiber. A second tether optical fiber has a first end optically coupled to a second distribution cable optical fiber at the access area, a second end, and a length between first and second ends of the second tether optical fiber; and a second optical connector coupled to the second end of the second tether optical fiber; wherein the length of the first tether optical fiber is less than the length of the second tether optical fiber.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 1 shows a side view of an access area of an optical fiber distribution system according to an exemplary embodiment.

FIG. 2 is a cut-away view showing optical coupling between a fiber optic tether and a distribution cable according to an exemplar) embodiment.

FIG. 3 is a cross-sectional view of a fiber optic tether according to an exemplary embodiment.

FIG. 4 is a cross-sectional view of a fiber optic tether according to another exemplary embodiment.

DETAILED DESCRIPTION

Figure 5:
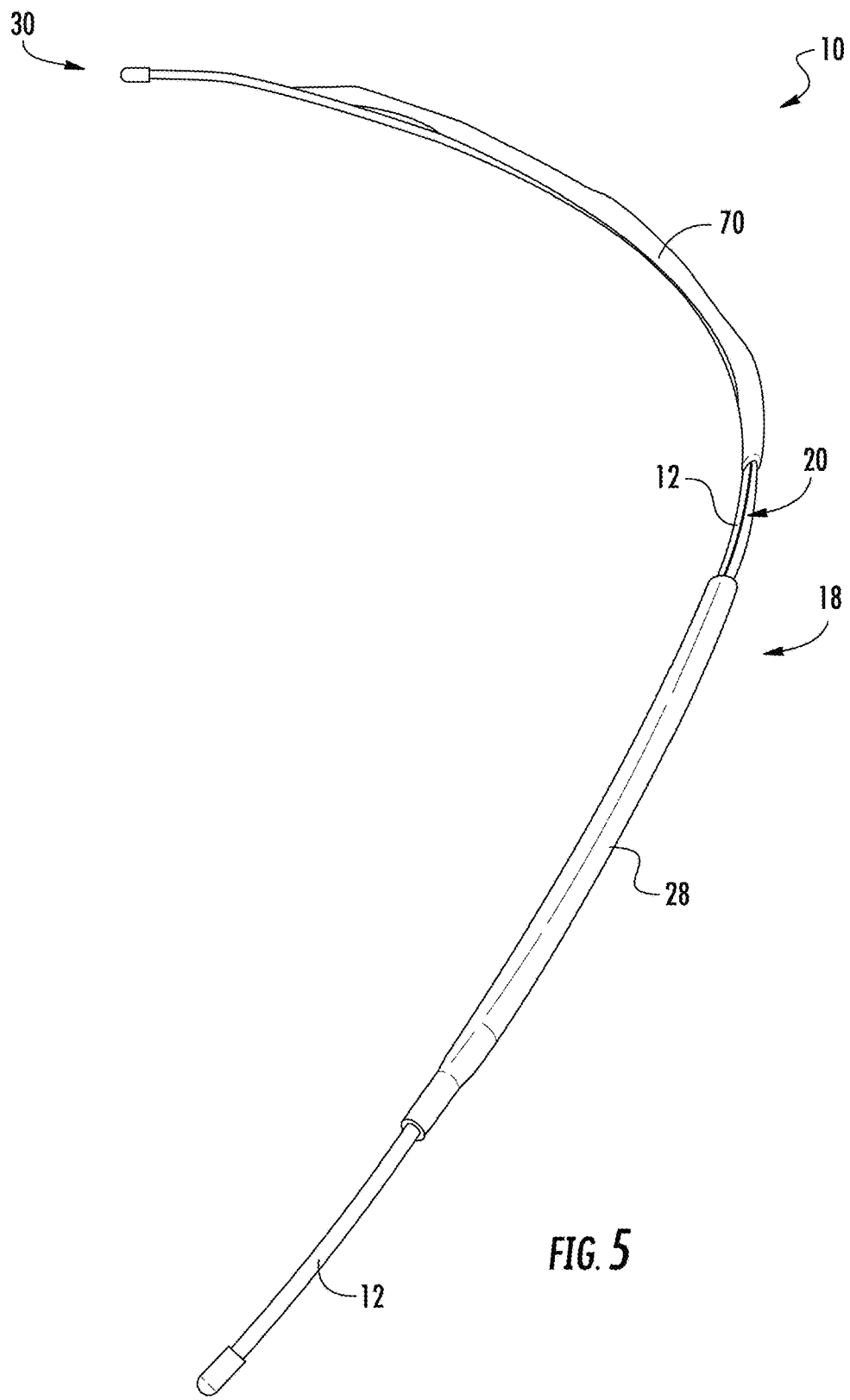
FIG. 5 is a perspective view of the access area of an optical fiber distribution system including a tether-supporting sleeve, according to an exemplary embodiment.

Referring generally to the figures, various embodiments of an optical fiber distribution system are shown. In various embodiments, the fiber optic tethers discussed herein each include at least one optical fiber that is optically coupled (e.g., spliced) to an optical fiber of a distribution cable at an access point (e.g., a mid-span access point) which allows the optical network to be branched off of the distribution cable. In various embodiments, the optical fiber distribution system discussed herein includes multiple access areas spaced from each other along the length of the distribution cable.

In various embodiments discussed herein, the fiber optic tethers are configured to provide for organization and/or to reduce the space occupied by the distribution cable and tethers at the access point. As discussed herein, each of the fiber optic tethers includes an optical connector optically coupled to the optical fiber of the tether, which facilitates connecting the tether to a cable (e.g., a drop cable) which runs the optical fiber to the user. In particular embodiments, each of the tethers at each access point has a different length such that the position of the optical connectors is staggered along the length of the distribution cable. By staggering the connectors, rather than stacking connectors (as is typically the case with tethers that have the same length as each other), the overall profile height of the distribution cable and the tethers at an access point can be reduced.

Further, in various embodiments, each of the tethers at an access point may be coupled to each other via a web located between the tethers. The webbing between adjacent tethers may have a different length than the webbing between adjacent pairs of tethers allowing the connector end of each tether to be routed independently of the other tethers. This webbing maintains the tethers at the access point in an orderly arrangement without the need to manage a plurality of individual tethers extending from the access point.

In addition, as discussed herein, the tethers are arranged in a manner that allows the tethers to be spirally wrapped around the distribution cable following installation, and in specific embodiments, the optical fiber distribution system discussed herein includes a constrictive sleeve that surrounds the tethers and holds the tethers along the outer surface of the distribution cable jacket. In various embodiments, the distribution system discussed herein provides a distribution cable access via tethers which provide a low height (e.g., a low profile), at least compared to some conventional tether arrangements such as those utilizing multiport termination arrangements, and/or or improved organization compared to conventional tether arrangements.

In contemplated applications, the pre-connectorized tethers of the present application may be used to provide connections and distribute service from higher fiber count distribution cables and are arranged to mate up with opposing cables (e.g., drop cables) which deliver fiber network service to the end user. The system discussed herein allows tethers to be pre-connectorized or pre-terminated in such a way that the cable would be "plug-and-play" in the outdoor environment, while at the same time providing for improved tether organization and low profile height as discussed above. This arrangement saves valuable time when installing a network and also saves valuable space on distribution poles, conduits or equipment housings.

Referring to FIG. 1 and FIG. 2, an optical fiber distribution system, such as system 10, is shown according to an exemplary embodiment. In general, system 10 includes a distribution cable, such as cable 12. Cable 12 includes an outer jacket 14 which generally extends the length of cable 12 between opposing first and second ends of the cable (e.g., head and tail ends), and outer jacket 14 surrounds a plurality of distribution cable optical fibers, shown as fibers 16. As will be understood, jacket 14 generally is a layer of polymer material (e.g., medium density polyethylene) that provides protection to fibers 16. Cable 12 includes a large number of optical fibers 16 (e.g., at least 12 fibers, at least 48 fibers, etc.) and is designed to distribute optical communication services from a central point in the network to a relatively large number of end users (e.g., network devices, cable boxes splitting out network service to a home, office, etc.).

System 10 typically includes one or more access areas 18 located along the length of distribution cable 12. The access areas 18 are located between the first and second ends of cable 12 and are generally referred to as mid-span access areas. In general, at access areas 18, one or more optical fiber tether, shown generally as tethers 20, are optically coupled to cable optical fibers 16, such that a portion of the optical network can be split out at a mid-point along the length of the distribution cable.

As shown best in FIG. 2, each of the tethers 20 includes at least one tether optical fiber 22, and within access area 18, each tether optical fiber 22 is optically coupled (e.g., via splicing) at an optical connection or splice point 32 to one of the cable optical fibers 16. In the embodiment shown, system 10 includes four tethers 20 at access area 18, but other numbers of tethers are contemplated. In various embodiments, each access area includes one or more tethers 20, two or more tethers 20, three tethers 20, five tethers 20, six tethers 20, eight tethers 20, ten tethers 20, twelve tethers 20, less than twelve tethers 20, less than twenty tethers 20, etc.

To provide this access, an opening, such as opening 24, is formed through cable jacket 14 at each access area 18. As shown, opening 24 may be formed through the side of cable jacket 14 by completely removing a section of cable jacket 14 from cable 12 such that fibers 16 are exposed in 360 degrees around the fibers. In other embodiments, opening 24 may be a relatively small breach in cable jacket 14 extending less than 360 degrees (e.g., less than 270 degrees, less than 180 degrees, etc.) around fibers 16. In general, to provide mid-span access to cable fibers 16 (as opposed to access through either the head or tail ends of the distribution cable), openings 24 are spaced a significant distance (e.g., at least 1 m, at least 10 m, at least 100 m, etc.) from both the head and tail ends of cable 12.

In this arrangement, tethers 20, and specifically tether optical fibers 22 extend inward through opening 24 to cable optical fibers 16 which allows the optical connection 32 (e.g., the splice) to be made between an inner end of each tether optical fiber 22 and a corresponding cable optical fiber 16. In the arrangement shown in FIG. 1, because access area 18 includes four tethers 20, access area 18 will include four optical connections 32, one between each tether optical fiber 22 and a cable fiber 16. In this manner, each tether optical fiber 22 at access area 18 is optically coupled to a cable optical fiber 16 such that the optical signals carried along the cable optical fiber 16 are transmitted into tether optical fiber 22. In general, each tether 20 has less optical fibers than cable 12 (e.g., tethers have 12 fibers or less, four fibers or less, a single fiber, etc.). In specific embodiments, each tether 20 is a single optical fiber tether including a single fiber optical connector.

As noted above, each tether 20 is pre-terminated and pre-connectorized allowing for easier onsite deployment of network communication services via optical fiber distribution system 10. As shown in FIG. 1, each tether 20 includes an optical connector 26 coupled to the downstream end of the optical fiber of tether 20 (e.g., the fiber end opposite from optical connection 32). In general, optical connector 26 is configured to engage a corresponding or mating optical connector of a downstream cable (such as a drop cable), which then runs to the next downstream point in the network, such as the end user. In various embodiments, optical connectors 26 are optical connectors configured for use in an outdoor environment. In various embodiments, optical connectors 26 are any suitable optical connector, such as but not limited to SC, LC, DC, FC, ST, SC/DC, MT-RJ, MTP, MPO and other like single or multi-fiber ferrules now known or hereafter developed.

An over-molded cover or shell 28 surrounds the splice point between tethers 20 and the corresponding fiber of cable 12 and also surrounds a portion of the length of tethers 20. As shown in FIG. 1, tethers 20 (and consequently tether fibers 22) extend out of and away from cover 28 toward the downstream end 30 of cable 12. In general, cover 28 protects and supports tethers 20 and provides a barrier or seal around opening 24 following installation of tethers 20. In various embodiments, the optical connections between tether fibers 22 and cable fibers 16 and covers 28 may be those as shown in U.S. Pat. No. 7,127,143 which is incorporated in herein by reference in its entirety.

Referring to the embodiment of FIG. 1, tethers 20 at access area 18 include four separate single fiber tethers 40, 42, 44 and 46, each having a different length which generally allows the optical connectors 26 of each of the tethers 40, 42, 44 and 46 to be staggered or non-overlapping. As shown in FIG. 1, tether 40, and correspondingly the optical fiber 22 of tether 40, has a longitudinal length that is less than the longitudinal length of tethers 42, 44 and 46. Similarly, tether 42, and correspondingly the optical fiber 22 of tether 42, has a longitudinal length that is less than the longitudinal length of tethers 44 and 46 but is longer than tether 40, and tether 44, and correspondingly the optical fiber 22 of tether 44, has a longitudinal length that is less than the longitudinal length of tether 46 but is longer than tethers 40 and 42. In the arrangement of FIG. 1, tether 46 is the longest tether of access area 18 having a longitudinal length greater than that of tethers 40, 42 and 44. It should be understood that while FIG. 1 shows tethers 40, 42, 44 and 46 fanned out for ease of illustration, the length difference shown are present even when tethers 40, 42, 44 and 46 are extended directly from cover 28 generally parallel to cable jacket 14.

Figure 6:
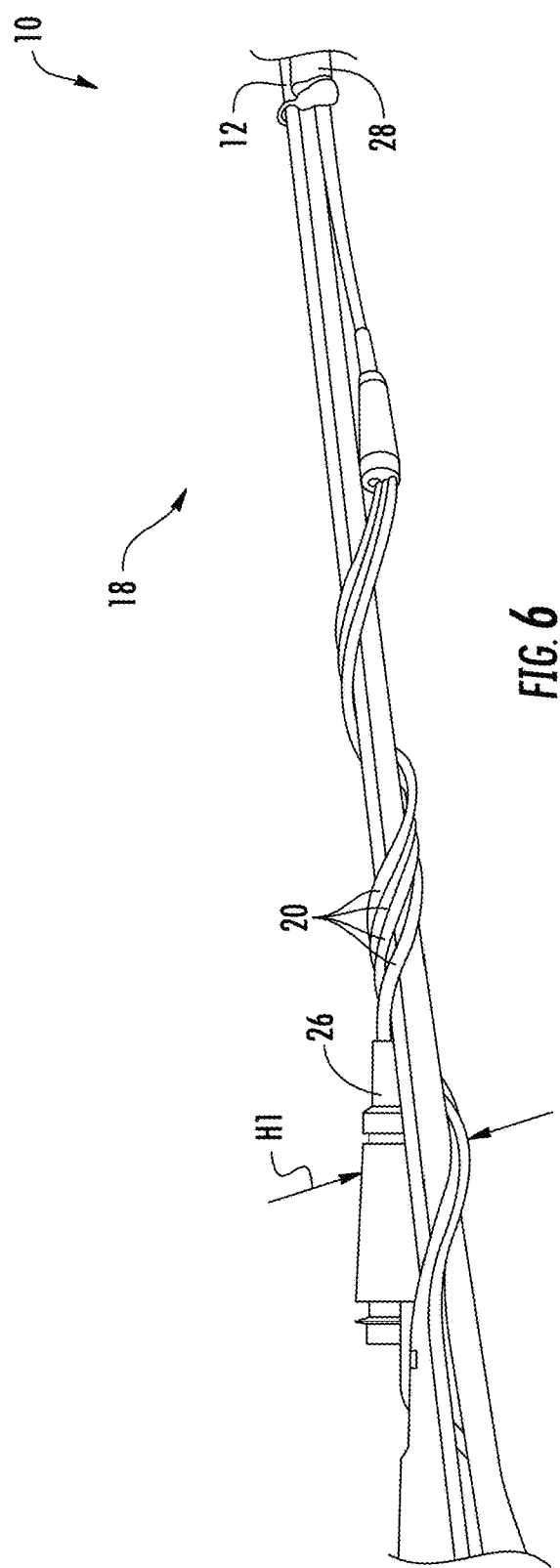
FIG. 6 is a perspective view of the access area of an optical fiber distribution system showing spirally wrapped tethers, according to an exemplary embodiment.

As shown in FIG. 1, the length differences of tethers 40, 42, 44 and 46 are such that individual tether optical connectors 26 are staggered which in turn allows the height or profile, shown as H1 in FIG. 6, to be less than is seen with non-staggered tether arrangements or tethers that utilize multi-connector termination hardware. In general, the length difference between tethers 40, 42, 44 and 46 is such that the optical connector 26 of one tether does not extend beyond the lengthwise midpoint of the optical connector 26 of the next longest tether. Thus, for example, in such embodiments, optical connector 26 of tether 40 does not extend beyond the midpoint of optical connector 26 of tether 42 when the tethers extended directly from cover 28 generally parallel to cable jacket 14. Similarly, in this arrangement, the length difference between tethers 40, 42, 44 and 46 is such that the longitudinal lengths in the direction parallel to longitudinal axis 48 between opening 24 (or cover 28) and the distal ends 50 of optical connectors 26 also varies in the same manner as the length of tethers 40, 42, 44 and 46 discussed above.

As shown best in FIG. 3, each tether 40, 42, 44 and 46 includes a tether jacket 52 that surrounds a tether fiber 22 and at least one elongate strength member, shown as a glass reinforced plastic rod 54. In general, tether jacket 52 is an outer polymer layer (e.g., of a medium density polyethylene) that provides protection to tether fibers 22 and that supports the components of each tether. In the embodiment, shown in FIG. 3, tether jackets 52 have elongate shape in cross-section taken perpendicular to axis 48, and this elongate shape is such that the width of each jacket 52 is greater than the height of the jacket 52. As will be understood, because of the length difference of each tether, the longitudinal lengths of tether jacket 52 also van, in the same manner as the length of tethers 40, 42, 44 and 46 as discussed above.

In various embodiments, system 10 is provided with a web 56 that joins together one or more adjacent tethers 20 of a particular access area. As shown in FIG. 3, web 56 is located between and couples together the outer surfaces of the jackets of tethers 40 and 42, of tethers 42 and 44, and of tethers 44 and 46. Webs 56 are segment of material (e.g., a polymer material, such as medium density polyethylene) that couples together tethers 40, 42, 44 and 46 along at least part of their length. As shown in FIG. 1, this allows a section of the tethers toward cover 28 to remain as a unitary body, which in turn allows tethers at access area 18 to be more orderly and easier to arrange. Further, webs 56 may have a length that is less than the lengths of tether jackets 52 which allows the connector ends of the tethers to be separated from each other and routed separately as needed to couple to the desired downstream devices or cables.

As shown in FIG. 3, webs 56 have a thickness (e.g., the vertical dimension in the orientation of FIG. 3) that is less than the height of tether jackets 52. This relative sizing provides a flexible tether bundle where the tethers are joined together by webs 56 and may also facilitate splitting or separating as needed. In particular embodiments, to further facilitate ease of separation, webs 56 may be made from a relatively weak or peelable material which allows tethers 40, 42, 44 and 46 to be separated from each other. In various embodiments, webs 56 are made from a polymer material that is compatible with or able to be bonded to tether jackets 52.

In FIG. 3, tethers 40, 42, 44 and 46 are shown arranged in a 1×4 array configuration. In other embodiments, other configurations are contemplated. For example in a specific embodiment, tethers 40, 42, 44 and 46 are arranged in a 2×2 array.

Referring to FIG. 4, tethers 40, 42, 44 and 46 are shown according to another embodiment. In this embodiment, tethers 40, 42, 44 and 46 each include a jacket 60 which is a substantially cylindrical jacket (e.g., a jacket having a circular cross-section as shown in FIG. 4). Further, as shown in the embodiment of FIG. 4, tethers 40, 42, 44 and 46 include one or more elongate strength elements, shown as one or more strength fiber 62. In a specific embodiment, strength fibers 62 may be one or more aramid fiber which surrounds tether fiber 22 within the interior space defined by each jacket 60. In such embodiments, strength fibers 62 may be arranged in layer between optical fiber 22 and the inner surface of each jacket 60.

Referring to FIG. 5, in various embodiments, optical fiber distribution system 10 further includes a sleeve 70. In general, sleeve 70 surrounds and is located outside of distribution cable 12 and outside of tethers 20. In general, sleeve 70 helps to restrain or bind tethers 20 to the outer surface of cable jacket 14, which helps to organize and to maintain a reduced height of tethers 20.

As shown in FIG. 5, sleeve 70 is located at least at a position between optical connections joining tether fibers 22 to cable fibers 16 (e.g. splices, such as optical connection 32 shown in FIG. 2, which is located within cover 28 as discussed above) and the downstream end 30 of cable 12. Specifically, sleeve 70 is positioned between cover 28 and downstream end 30 of cable 12. Sleeve 70 applies a radially inwardly directed force (relative to cable jacket 14) onto tether jackets 52 such that tethers 20 are held or pressed against cable jacket 14. In this manner, sleeve 70 maintains tethers 20 in an orderly arrangement along cable jacket 14 downstream from cover 28.

In various embodiments, sleeve 70 is configured in various ways to facilitate maintenance of tethers 20 and or installation onto cable 12. In some embodiments, sleeve 70 is formed from an elastic, constrictive material that applies the inwardly directed force on to tethers 20, and in particular embodiments, is formed from an elastic mesh material. In specific embodiments, the longitudinal length of sleeve 70 is less than the length of at least one of the tethers 20 such that the optical connector 26 of the tether is located outside of sleeve 70 such that the connector is readably accessible for connecting with a downstream cable.

Referring to FIG. 6, in various embodiments, tethers 20 of system 10 may be arranged to further maintain tethers 20 in an orderly fashion and to maintain a relatively low or streamlined profile. In one embodiment, tethers 20 are spirally wrapped around distribution cable 12, and in such embodiments, the outer surfaces of tether jackets 52 are in contact with the outer surface of distribution cable jacket 14. In specific embodiments, the outer surfaces of tether jackets 52 are in contact with the outer surface of distribution cable jacket 14 for a significant portion of the perimeter of cable jacket 14, and in specific embodiments, the outer surfaces of tether jackets 52 are in contact with the outer surface of distribution cable jacket 14 for at least 180 degrees around cable jacket 14, at least 360 degrees around cable jacket 14, at least 720 degrees around cable jacket 14, etc. In various embodiments, sleeve 70 may be applied after tethers 20 are spirally wrapped such that sleeve 70 helps to maintain tethers in the spirally wrapped arrangement.

As shown best in FIG. 6, the staggered tether arrangement, the spiral tether wrapping and/or the constrictive sleeve, provides a fiber optic distribution system 10 having height or profile, shown as H1, at the access area 18 that is typically less than other tether configurations. In various embodiments, the spiral pitch of wrapped tethers 20 is selected to avoid overlap of the optical connectors providing the low profile arrangement discussed herein, and in some such embodiments, the spiral wrapping of tethers 20 may avoid connector overlap even in embodiments where tethers 20 have the same length as each other.

As shown in FIG. 6, H1 is a maximum outer dimension perpendicular to the longitudinal axis of distribution cable 12 taken through at least one of the optical connectors 26 of tethers 20. In various embodiments, H1 is less than 12 inches, specifically less than 6 inches and more specifically is less than 3 inches. Applicant believes that this arrangement provides substantially lower profile access areas as compared to distribution arrangements that utilize multi-port connector hardware or that use coiled or looped tether management arrangements. The low profile arrangement discussed herein provides access to a distribution cable while conserving space on utility poles or conduits. In addition, the low profile also decreases the area available to experience ice or wind loading.

As will be understood, the optical fibers of the cables discussed herein include optical fibers that may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate and chalcogenide glasses, as well as crystalline materials such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber.

In particular embodiments, tether optical fibers 22 are bend insensitive optical fibers configured to have low attenuation characteristics in response to strain applied to the fibers. For example, in one embodiment, tether optical fibers 22 are configured to have a bend attenuation of less than 0.4 dB at 1550 nm when tether 20 is wrapped into coils of about 6 inches in diameter. In specific embodiments, tether optical fibers 22 may be bend insensitive fibers as disclosed in U.S. application Ser. No. 12/636,044, now U.S. Pat. No. 8,224,140, filed Dec. 11, 2009, and/or in U.S. application Ser. No. 12/705,739, now U.S. Pat. No. 8,582,941, filed Feb. 15, 2010, both of which are incorporated herein by reference in their entireties.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical fiber distribution system comprising:
    a distribution cable comprising:
        a plurality of distribution cable optical fibers extending between a first end and a second end of the distribution cable; and
        a distribution cable jacket surrounding the plurality of cable optical fibers;
    an access area located between the first end and the second end of the distribution cable, wherein the access area provides access through the distribution cable jacket to the distribution cable optical fibers;
    a first tether optical fiber having a first end optically coupled to a first distribution cable optical fiber at the access area, a second end and a length between first and second ends of the first tether optical fiber;
    a first optical connector coupled to the second end of the first tether optical fiber;
    a second tether optical fiber having a first end optically coupled to a second distribution cable optical fiber at the access area, a second end and a length between first and second ends of the second tether optical fiber; and
    a second optical connector coupled to the second end of the second tether optical fiber;
    wherein the length of the first tether optical fiber is less than the length of the second tether optical fiber;
    wherein the first tether optical fiber is surrounded by a first tether jacket and the second tether optical fiber is surrounded by a second tether jacket, wherein both of the first and second tether optical fibers extend in the same direction from the access area along the distribution cable jacket toward the second end of the distribution cable, wherein a longitudinal length of the first tether jacket is less than a longitudinal length of the second tether jacket; and
    wherein the first and second tether optical fibers are wrapped spirally around the distribution cable jacket such that outer surfaces of both the first and second tether jackets are in contact with an outer surface of the distribution cable jacket.

2. The optical fiber distribution system of claim 1, wherein the difference in length between the first tether optical fiber and the second tether optical fiber is such that the first optical connector does not extend beyond a midpoint of the second optical connector when the first and second tether optical fibers are extended parallel to the cable jacket away from the access area.

3. The optical fiber distribution system of claim 1, wherein, when both the first and second tether optical fibers are fully extended along the distribution cable jacket, a longitudinal length from the access area to a distal point of the first optical connector is less than a longitudinal length from the access point to a distal point of the second optical connector.

4. The optical fiber distribution system of claim 1, further comprising a web coupling an outer surface of the first tether jacket to an outer surface of the second tether jacket along at least a portion of the lengths of the first and second tether jackets.

5. The optical fiber distribution system of claim 4, further comprising at least one elongate strength member located within the first tether jacket and at least one elongate strength member located within the second tether jacket.

6. The optical fiber distribution system of claim 1, wherein a maximum outer dimension perpendicular to a longitudinal axis of the distribution cable through at least one of the first and second optical connectors is less than two inches.

7. The optical fiber distribution system of claim 1, further comprising a sleeve surrounding the distribution cable jacket, the first tether jacket and the second tether jacket at a position between the access area and the second end of the distribution cable, wherein the sleeve applies a radially inwardly directed force onto the first tether jacket and the second tether jacket holding the first and second tether jackets to the outer surface of the distribution cable jacket.

8. An optical fiber distribution system comprising:
a distribution cable comprising:
a plurality of distribution cable optical fibers; and
a distribution cable jacket surrounding the plurality of cable optical fibers, the distribution cable jacket extending between a first end and a second end of the distribution cable;
an opening in the distribution cable jacket allowing access the distribution cable optical fibers at a position between the first and second ends of the distribution cable;
a first optical fiber tether comprising:
a first tether optical fiber having a first end extending through the opening and optically coupled to a first distribution cable optical fiber and a second end opposite the first end; and
a first tether jacket surrounding the first tether optical fiber; and
a second optical fiber tether comprising:
a second tether optical fiber having a first end extending through the opening and optically coupled to a second distribution cable optical fiber and a second end opposite the first end: and
a second tether jacket surrounding the second tether optical fiber;
a web extending between and coupling an outer surface of the first tether jacket to an outer surface of the second tether jacket;
a first optical connector optically coupled to the second end of the first tether optical fiber; and
a second optical connector optically coupled to the second end of the second tether optical fiber;
wherein the web extends along a portion of the length of the first and second tether jackets such that a longitudinal length of the web is less than the longitudinal lengths of both the first and second tether jackets.

9. The optical cable distribution system of claim 8, wherein, when both the first and second optical fiber tethers are fully extended along the distribution cable jacket, a longitudinal length from the opening in the distribution cable jacket to the first optical connector is less than the longitudinal length from the opening in the distribution cable jacket to the second optical connector such that the first optical connector is located between the opening in the distribution cable jacket and the second optical connector.

10. The optical cable distribution system of claim 8, further comprising:
a cover surrounding the distribution cable jacket, the first tether optical fiber and the second tether optical fiber at the position of the opening, wherein the first and second tether optical fibers extend out of the cover toward the second end of the distribution cable; and
a sleeve surrounding the distribution cable jacket, the first tether jacket and the second tether jacket at a position between the cover and the second end of the distribution cable, wherein the sleeve applies a radially inwardly directed force onto the first tether jacket and onto the second tether jacket holding the first and second tether jackets to an outer surface of the distribution cable jacket.

11. The optical cable distribution system of claim 10, wherein the first and second optical fiber tethers are wrapped spirally around the distribution cable jacket and the sleeve holds the first and second optical fiber tethers in the spiral arrangement.

12. The optical fiber distribution system of claim 8, further comprising at least one elongate strength member located within the first tether jacket and at least one elongate strength member located within the second tether jacket.

13. An optical fiber cable system comprising:
a multi-fiber cable comprising:
at least twelve cable optical fibers; and
a cable jacket surrounding the at least twelve cable optical fibers and extending between first and second ends of the multi-fiber cable;
an opening through a side of the cable jacket allowing access to the cable optical fibers at a position along the length of the cable jacket at least 1 m from both first and second ends of the cable;
a first tether comprising:
a first tether optical fiber having a first end and a second end opposite the first end;
a first tether jacket surrounding the first tether optical fiber;
a first optical connector optically coupled to the second end of the first tether optical fiber; and
a first optical connection between the first tether optical fiber and one of the cable optical fibers;
a second tether comprising:
a second tether optical fiber having a first end and a second end opposite the first end;
a second tether jacket surrounding the second tether optical fiber;
a second optical connector optically coupled to the second end of the second tether optical fiber; and
a second optical connection between the second tether optical fiber and one of the cable optical fibers; and
a sleeve surrounding the cable jacket, the first tether jacket and the second tether jacket at a position between the first and second optical connections and the second end of the multi-fiber cable, wherein the sleeve applies a radially inwardly directed force onto the first tether jacket and onto the second tether jacket holding the first and second tether jackets to an outer surface of the cable jacket,
wherein the first and second tethers are wrapped spirally around the cable jacket and the sleeve holds the first and second tethers in the spiral arrangement.

14. The optical fiber cable system of claim 13, wherein the sleeve has a length that is less than a length of the second tether jacket, wherein the sleeve is formed from a constrictive mesh material.

15. The optical fiber cable system of claim 13, wherein, when both the first and second tethers are fully extended along the cable jacket, a longitudinal length from the opening in the cable jacket to the first optical connector is less than the longitudinal length from the opening in the cable jacket to the second optical connector such that the first optical connector is located between the opening in the cable jacket and the second optical connector.

16. The optical fiber cable system of claim 13, wherein a maximum dimension perpendicular to a longitudinal axis of the multi-fiber cable through the sleeve is less than six inches.

* * * * *

UNITED STATES PATENT AND TRADEMARK OFFICE
CERTIFICATE OF CORRECTION

PATENT NO. : 10,437,003 B2  
APPLICATION NO. : 16/160014  
DATED : October 8, 2019  
INVENTOR(S) : Joseph Clinton Jensen et al.

Page 1 of 1

It is certified that error appears in the above-identified patent and that said Letters Patent is hereby corrected as shown below:

In the Claims

In Column 9, Line 38, Claim 8, delete "end:" and insert -- end; --, therefor.

In Column 9, Line 52, Claim 9, delete "optical cable" and insert -- optical fiber --, therefor.

In Column 9, Line 61, Claim 10, delete "optical cable" and insert -- optical fiber --, therefor.

In Column 10, Line 9, Claim 11, delete "optical cable" and insert -- optical fiber --, therefor.

Signed and Sealed this
Eighteenth Day of February, 2020

Andrei Iancu
*Director of the United States Patent and Trademark Office*